Jan. 2, 1968  L. M. CARPENTER ET AL  3,361,016
WIRE STRIPPER
Filed Dec. 8, 1966  2 Sheets-Sheet 1
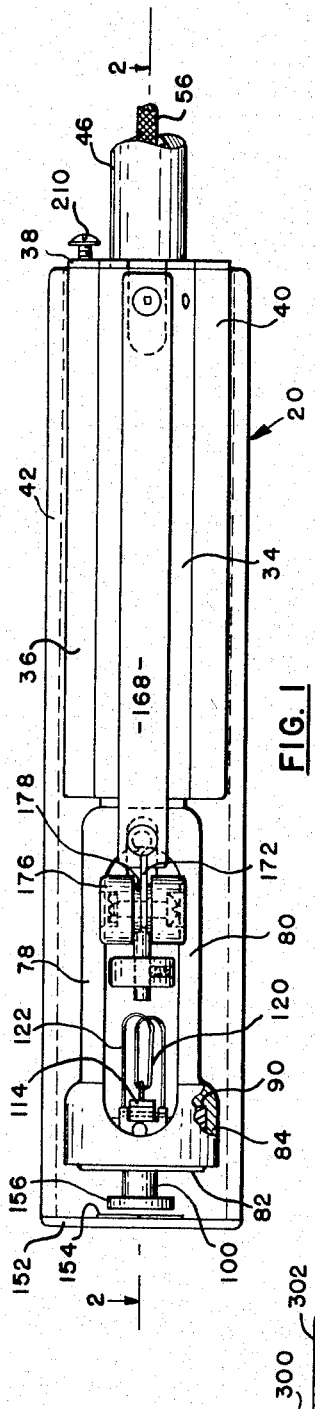
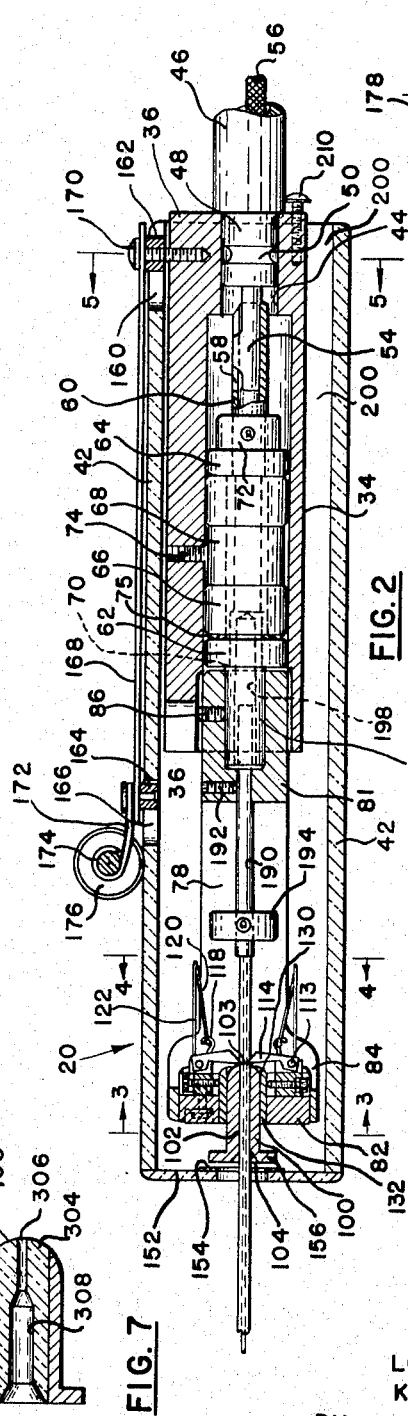
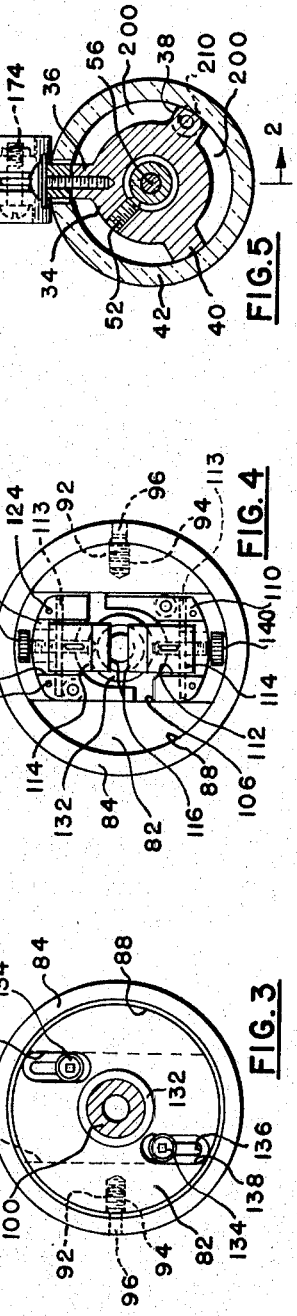
INVENTORS.
LOUIS M. CARPENTER
KENNETH L. DUNN
BY *F. P. Kerper*
ATTORNEY.

Jan. 2, 1968  L. M. CARPENTER ET AL  3,361,016
WIRE STRIPPER
Filed Dec. 8, 1966  2 Sheets-Sheet 2
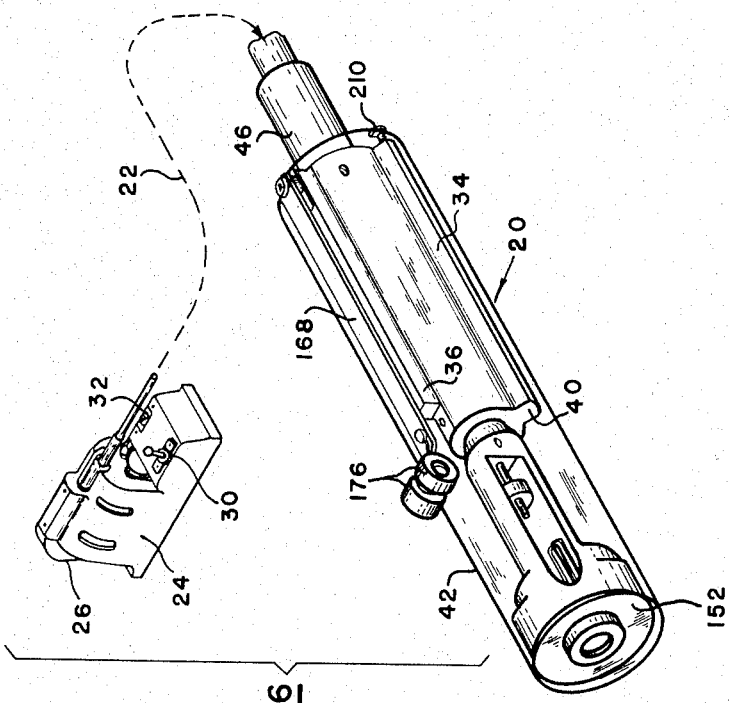
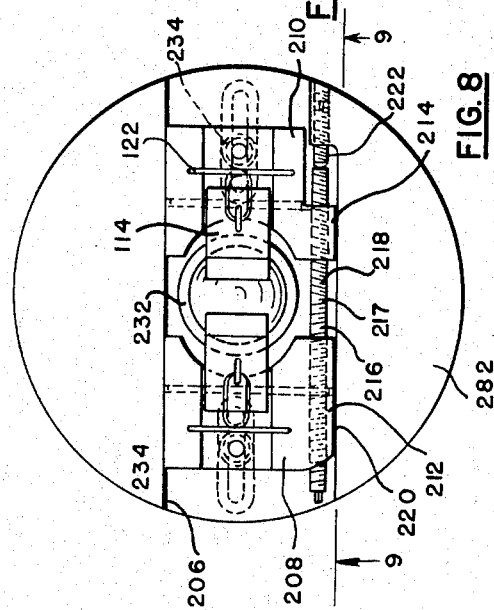
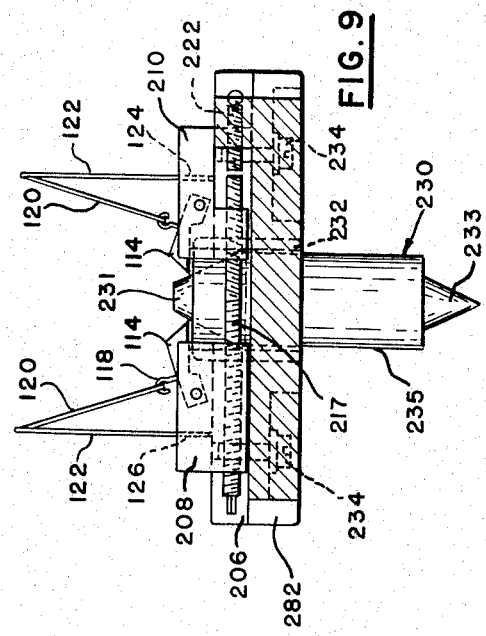
INVENTORS.
LOUIS M. CARPENTER
KENNETH L. DUNN
BY
ATTORNEY.

United States Patent Office

3,361,016
Patented Jan. 2, 1968

3,361,016
WIRE STRIPPER
Louis M. Carpenter, Manlius, and Kenneth L. Dunn, Fayetteville, N.Y., assignors to Carpenter Manufacturing Co., Inc., Manlius, N.Y., a corporation of New York
Filed Dec. 8, 1966, Ser. No. 600,143
7 Claims. (Cl. 81—9.51)

This invention relates to apparatus for the removal of insulation from the ends of electrical conductors preparatory to establishing connections between wire and wire terminals.

In Letters Patent 3,074,301 there is disclosed a wire stripper of the rotary type having a hinged blade or pair of blades adapted to be swung open by insertion of an insulated wire end through a guide bushing, the blade or blades cutting into the insulation upon withdrawal. The hinging of the blades to allow entry of the insulated wire end, being dependent on the wire having sufficient stiffness to push the blades aside, limited its field of use. Strippers have been proposed where cutting blades moving radially have been manually retracted to permit free insertion of the insulated wire end into the stripping position. Such strippers were not usually portable, and operation was generally effected by foot actuated linkage.

The present invention is directed to a light weight single hand operated stripper which is portable by reason of its lightness and a flexible drive shaft, and in which the blades are hinged to open position by thumb operation to permit unobstructed entry of the insulated conductor end into the stripping position. Stripping is then effected under thumb control. The invention is further directed to a single hand held tool wherein the stripping apparatus is entirely enclosed, and wherein provision is had for collecting, or disposing of the insulation strippings or slugs. The invention is further directed to a removable handle housing to provide access to the tool for adjustment or change of wire bushing size, and to an improved form of adjustment. The apparatus is capable of stripping any insulated fine wire capable of having an end inserted through an apertured guide bushing into position, there being no obstruction to the free insertion of the wire into stripping position.

More particularly, the invention includes a rotary stripping head having a guide bushing slidably mounted in the head to engage and open oppositely hinged cutting blades through thumb actuated relative movement between the rotary head, and an enclosing handle sleeve.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

FIGURE 1 is a side elevational view of the stripper, with parts broken away;

FIGURE 2 is a longitudinal section taken on the line 2—2 of FIGURE 1 or FIGURE 5;

FIGURE 3 is an enlarged transverse sectional view taken on the line 3—3 of FIGURE 2;

FIGURE 4 is an enlarged transverse sectional view taken on the line 4—4 of FIGURE 2;

FIGURE 5 is an enlarged transverse sectional view taken on the line 5—5 of FIGURE 2;

FIGURE 6 is a perspective view of the stripper showing its source of power in miniature;

FIGURE 7 is a modified form of wire guide;

FIGURE 8 is an enlarged view of a modified form of stripper head, and

FIGURE 9 is a sectional view taken on the line 9—9 of FIGURE 8.

Referring to FIGURES 1 and 6 there is shown a portable stripping apparatus 20 adapted to be held in the hand, and a flexible drive 22 therefor driven from a small high speed motor 24, having a speed reduction to about 1750 r.p.m., indicated at 26. The motor is provided with an on and off switch 30, and reverse switch 32, and is adapted to be set on a bench or hung within a convenient distance of the area of use for the stripper 20.

Referring to FIGURES 1, 2, 5 and 6 there is shown a tubular bearing housing 34 having lengthwise ribs 36, 38 and 40 upon which is slidably supported a tubular handle 42 which serves also as a protective sleeve for the rotary head housed therewithin, and as a control, and as a collector for insulation strippings or slugs removed from the ends of insulated wire. The housing 34 has a bore 44 to receive the non-rotatable end 46 of a flexible shaft casing 48, the head having an annular groove 50 adapted to be secured in the housing by a setscrew 52 (see FIG. 5). The key end 54 of the flexible shaft 56 projects into the slotted end 58 of a shaft 60 which is journalled in ball bearings 62 and 64, spaced by a sleeve 66, having a central reduced diameter portion 68. The inner race of bearing 62 abuts against a shoulder 70 on the shaft 60, while the inner race of bearing 64 is held in position by a collar 72 affixed to the shaft 60.

The sleeve 66, through an annular spring washer 75 bears against the outer races of the bearings 62 and 64 and the washer 75 is somewhat compressed and so held by compression between the collar 72 and the shoulder 70, whereby the bearings are under slight axial compression and thus free of lost motion. The sleeve 66 is held within the bore of the housing 30 by a setscrew 74.

Fitted on the enlarged end 76 of shaft 60 is a rotary head member, having spaced arms, 78 and 80 connecting the hub portion 81 with the annular face plate end 84, the hub being secured to the shaft 60 as by a setscrew 86. The head member is internally bored as at 88 to receive the face plate 82, and the face plate is seated in the bore against a shoulder 90. The face plate is held in position by a setscrew 92 disposed in a radial threaded bore 94 in the face plate. Such setscrew has an Allen head, and is reached through a bore 96 of smaller diameter in the annular end 84, and the setscrew secures the face plate, by having its head end screwed outwardly into engagement with the internal surface 94 of the annular end. The head end of the setscrew may be conical to center in the bore 96, when screwed outwardly to hold the face plate.

The face plate has a central lined aperture in which is slidably disposed a bushing 100, having a bore 102 of a diameter to receive the end of a wire with its insulation, the bore having a flared entrance 104. The face plate is provided with a transverse groove 106 on its inside face, in which are positioned opposed blade blocks 108 and 110 of identical construction. Each blade block has a radial channel 112 in which is provided, as at 113, a blade 114 having a cutting edge 116. Each blade has a spring arm 118 in the form of a hook, to receive the loop 120 of a double wire spring 122, the ends of which are inserted in apertures 124 and 126 in the sides of each blade block. The loop of the spring is readily detached from the blade hook by flexing. In practice each spring loop urges its blade into light resilient contact with the end 130 of the liner sleeve 132, fixed in an aperture of the face plate.

Each blade block is secured in the groove 106 by a screw 134, extending through a radial slot 136, and the head of the screw is disposed in an elongated recess 138.

Loosening the screw, permits radial adjustment of the blade block. Fine adjustment of the blade block is attained by adjusting a radial screw 140, threaded in the blade block, which screw abuts the liner sleeve 132.

The protective sleeve 42 is slidably disposed over the housing 34, and stripper head. Such sleeve has an annular disk 152 on its end, and a Rulon, Teflon, or other annular wear member 154 is provided to engage the flanged end of the bushing when the sleeve 42 is slid on the housing 34, to move the bushing axially inwardly of the sleeve 132. When the bushing is moved inwardly, the inner end engages the blades 114 to pivot the blades away from the face plate a sufficient distance to permit the free insertion of an end of insulated wire to be stripped.

To render the sleeve 42 slidable on the bearing housing 34, the sleeve is provided with an end slot 160 which rides on a boss 162 affixed to one of the ribs 36 of the housing 34. It will be understood that the sleeve nicely fits about the three ribs in such a manner as to be freely slidable. The overall axial travel of the sleeve, relative to the housing is limited by a second boss 164 riding in a slot 166 in the sleeve. Such boss is affixed to a spring arm 168 secured at one end by the screw 170 that secures boss 162 to the rib.

The free end of the spring arm 168 is provided with a stiff wire extension 172, having a bearing loop 174 through which extends the shank of a screw, holding two rubber rollers 176 on opposite sides of loop 174. Spacer washers 178 are provided, in order to permit free rotation of the rollers 176. Such rollers are adapted to be engaged by the thumb, while the sleeve is in the grasp of the operator's hand. By rotating the rollers counter-clockwise, as in FIGURE 2, while in friction contact with the sleeve 42, the sleeve is caused to retract, to engage the bushing 102 and cause the bushing to spread the blades 114. Such operation is effected prior to insertion of the end of insulated wire into the stripper head. The movement of the sleeve may be precisely controlled by the adjustable screw 210 threaded in a rib 38 of the housing, the head of the screw engaging the sleeve end to act as a stop.

The hub of the stripper head is provided with a coaxial bore in which is adjustably mounted a rod 190, adapted to act as a stop, to control the length of wire to be stripped. The stop, is secured by setscrew 192, and may have a collar 194 to act as a further stop for wire that may be too flexible to always engage the end of rod 190. The shaft has an axial bore 198 to receive the rod 190, and to permit a wide range of adjustment.

The strippings of insulation are initially confined to the sleeve, and may slide out the back end of the sleeve by reason of the grooves 200 formed between ribs 36, 38 and 40. The handle 42 may be transparent plastic from the slot 166 to the end disk 152, which may also be transparent. The sleeve may be rendered translucent from the slot to the cable end, since this portion is in effect the handle or grip region.

To remove the handle 42 from the enclosed stripper assembly, the spring arm 168 can be flexed to lift the boss 164 from the slot 166, whereupon the sleeve 42 is readily slid off the housing 40.

The bushings 102 will be supplied in a wide range of sizes to accommodate the outside diameter of various insulated wire to be stripped. The inner end of each bushing may be spherical as at 103, so as to ride smoothly on the underside of the blades 114. For extremely small sizes of wire, the bushing may be as indicated at 300, in FIGURE 7, and comprise a sleeve 302, with a nylon core 304 suitably bored as at 306 to receive the size insulated wire to be employed. The bore is enlarged as at 308, to shorten the length of the bore 306 to a length suitable to the size wire to be stripped.

In FIGURES 8 and 9 there is shown a modified blade block adjustment wherein the blade blocks 208 and 210 have lateral extensions 212 and 214, in which there is threaded a rod 217 having right and left hand thread portions 216 and 218. The face plate groove 206 is widened as at 220 to accommodate the extensions 212 and 214, and a stop screw 222, coaxial with the rod 217, is threaded in the face plate 282. A tool 230, having conical ends 231 and 233 may be slid in the sleeve 232 to center the blade blocks, after which stop screw 222 is brought into abutment with the end of rod 217. Thereafter any rotation of rod 217 one way or the other while abutting screw 222 results in simultaneous adjustment of both blade blocks equally toward or away from the center. Thus once screw 222 is adjusted, the blade blocks are quickly adjusted for different conductor diameters. The conical ends 231 and 233 of the tool provide a wide range of diameters, the tool being reversed for smaller diameters from the positions shown. By dividing the cone in this manner, a substantial portion of the cylindrical body portion 235 of the tool will always lie in the sleeve 232 to accurately center the tool. It will be understood that when adjustments are made the screws 234 are loosened, and when the adjustment is completed, the screws 234 are tightened.

It will be seen from the foregoing, that a portable hand held stripper is provided that can be employed at the bench or at the switch board or in close situations where short leads from a complicated wiring harness require stripping at the point of completing a connection or termination. The apparatus is safe, all rotating parts being completely enclosed. The operator in actuating the thumb control can feel the stripping action taking place. The friction rollers, being journalled on a strip anchored upon the bearing housing, provides a lever action that reduces the amount of thumb pressure necessary to operate the stripper.

The apparatus is accurately adjustable for any diameter of insulated wire. Through a set of bushings having a range of bore sizes, insulated wires of any exterior diameter can be accommodated. In adjusting the blades, the spacing between the blade cutting edges, when in closed position will be just a trifle greater than the diameter of the conductor, and the diameter of the bushing bore will be sufficient to afford easy insertion, and of sufficient over size so that if the insulation and conductor are eccentric, the conductor can center itself. The apparatus, by suitable adjustment, can strip the insulation surrounding the coaxial shield from coaxial cable and by further adjustment, or the use of a second stripper properly adjusted, remove the primary insulation from such cable.

Through actuation of the blades to the open position by the bushing, control over the blades in their return to and through the stripping operation is under continuous control of the operator, insofar as the stripping time is concerned. By releasing the blades immediately, and withdrawing the conductor at about the same time, stripping in a minimum of time is effected. A slower operation for certain types of insulation is under the control of the operator, since the operator controls the rate at which the blades are allowed to close, and the rate at which the wire is withdrawn. Reversal of the drive may effect a twist in stranded conductors in such direction as is desired.

The clearance angle between the face of the blade that rides on the sleeve, and the clearance surface behind the blade can be 75° or more or at a sharper angle such as 50 degrees, depending on the nature of the insulation. The higher angle provides an inclined blunt surface behind the cutting edge which tends to crowd the slug loose from the conductor, so that upon completion of the cut, the slug is broken completely loose and the conductor end bared.

While a single embodiment with a variation of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A wire stripper comprising a sleeve in the form of a handle, having an annular closure at one end, a bearing housing slidably disposed within said sleeve having a stripper head journalled therein, said stripper head having a face plate adjacent to but inwardly disposed with respect to said closure, a guide bushing extending through and slidably disposed in said plate, and having an aperture coaxial with said stripper head to receive an end of insulated wire, blade means pivotally mounted upon the back of said plate having cutting edge means yieldingly urged to overlie a portion of said bushing aperture, and means causing said blade means to be pivotally hinged away from said plate to move said cutting edge means radially outward by axial sliding movement of said bushing, and means for effecting sliding movement of said bushing by effecting relative movement between said handle sleeve and said bearing housing.

2. A wire stripper according to claim 1 wherein the bearing housing has a plurality of radial ribs spacing the bearing housing from the handle housing, to provide a discharge passage for strippings.

3. A wire stripper according to claim 1 wherein a thumb operated roll frictionally engaging the handle housing and pivoted in fixed relation to said bearing housing provides thumb operated control to effect said relative movement.

4. A wire stripper according to claim 3 wherein the sleeve is provided with an axially extending slot, and said housing is provided with a boss extending through the slot, and the thumb operated friction roll is journalled at the end of a resilient arm affixed to said boss.

5. A wire stripper in accordance with claim 1 wherein said cutting edge means comprises a pair of like blades pivoted on blade blocks radially adjustable for symmetrical disposition on the back face of said plate.

6. A wire stripper in accordance with claim 5 wherein said blade blocks are simultaneously adjustable in opposite directions by a screw having a left hand thread in one blade block and a right hand thread in the other.

7. A wire stripper in accordance with claim 6 wherein the blade is provided with an adjustable abutment for the end of said screw.

References Cited

UNITED STATES PATENTS

| | | | |
|---|---|---|---|
| 2,826,871 | 3/1956 | Baker | 81—9.51 X |
| 2,915,928 | 12/1959 | Felts et al. | 81—9.51 X |
| 3,074,301 | 1/1963 | Carpenter | 81—9.51 X |
| 3,153,958 | 10/1964 | Keys | 81—9.51 X |
| 3,241,407 | 3/1966 | Oehlerking | 81—9.51 X |

FOREIGN PATENTS 123,507  2/1947  Australia.

MILTON S. MEHR, *Primary Examiner.*